Patented June 9, 1953

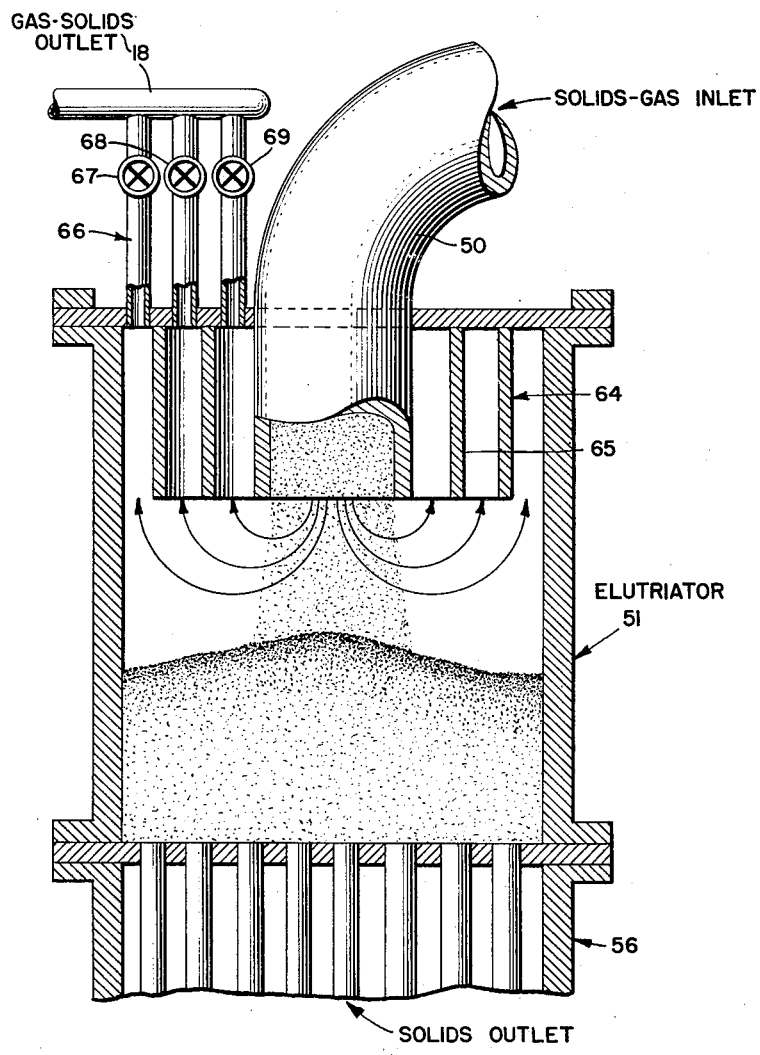

2,641,335

UNITED STATES PATENT OFFICE 2,641,335

GAS-SOLID SEPARATOR

Clyde H. O. Berg, Long Beach, Calif., assignor to Union Oil Company of California, Los Angeles, Calif., a corporation of California Application January 12, 1946, Serial No. 640,979

1 Claim. (Cl. 183—106)

This invention relates broadly to the separation or classification of materials by elutriation in a gaseous media, and more particularly to the continuous classification of granular or powdered solids employed in dynamic systems such as fluid or moving bed catalytic processes, adsorption processes, or the like.

The invention in one of its embodiments contemplates as one of its objects the provision of a method of separation or classification using a gradation of the velocity of material under controlled conditions between a maximum velocity, at which there is no settling, and a minimum velocity, at which the settling is complete. The invention in such embodiment contemplates the provision of a system wherein granular or powdered material suspended in a moving carrier fluid may be classified in a continuous operation by adjusting a velocity of flow of such carrier fluid as hereinafter described.

Particle size plays a very important part in many chemical reactions, having a marked effect on speed of reaction, quality of final product, ease of process control, and the like. In many chemical processes which deal with solid catalysts, adsorbents, or the like, it is, therefore, necessary to determine and control particle size. In such processes this particle size control is advantageously carried out in a continuous and semi-automatic manner in order that process conditions and variables which are dependent upon the particle size distribution of the catalyst, adsorbent, or the like may be maintained substantially constant. I have found in this regard that elutriation offers many advantages over the methods of control and the present invention is directed to the means of employing the principles of elutriation in such processes as described to effect this control.

It is therefore an object of the present invention to provide a means of continuously controlling the particle size distribution of a solid granular material in a process in which such granular material is caused to move in a continuous or semi-continuous stream.

It is another object of the present invention to provide an apparatus for the continuous classification of granular or powdered solids by means of elutriation in a fluid media.

Other objects and advantages of the present invention will become apparent to those skilled in the art as the description thereof proceeds.

The methods and apparatus of my invention may be most conveniently understood with reference to the accompanying drawing wherein the principles thereof are illustrated.

In the drawing is shown in vertical cross section a solids gas inlet 50, elutriator 51, solids outlet 56, and vent line 18. The solids gas inlet extends into the upper portion of chamber 51 a distance of at least one-third the total length thereof. The extended portion of inlet 50 is surrounded by concentric baffles 64 and 65 forming annular paths between the outside of the extension of the inlet 50 and the inside of chamber 51 through which the gas must flow in order to be withdrawn by means of the gas manifold 66. This manifold is so constructed as to provide outlet means for each of the annular spaces formed by the walls of the elutriator, the concentric baffles, and the walls of the solids gas inlet extending into the elutriator. In the drawing as shown the gas exhaust manifold is controlled by valves 67, 68 and 69, whereby the gas may be removed from the elutriation chamber in from one to three streams, and thus there is provided a means of controlling the velocity of the gas as it flows upwardly in the elutriator. If valve 67 is open and valves 68 and 69 are closed the entire gas flow will be forced to pass through the annular space formed by the concentric baffle 64 and the walls of chamber 51; whereas, if all three of the valves 67, 68 and 69 are open the gas may pass through all of the annular spaces formed as described, thus the velocity may be doubled or tripled, the degree of removal of fines being a function of which of these velocities is employed. It is obvious that the number of baffles and correspondingly the number of outlet means in the exhaust gas manifold may be varied within wide limits depending upon the size and the application of the equipment to be employed. Thus I may employ only one concentric baffle and thereby provide means for doubling the velocity of the gas as it flows from the elutriation chamber, or I may employ as high as nine or ten baffles thereby providing means for increasing the velocity of the gas by a proportional factor. It should be pointed out that the degree of flexibility of the apparatus is dependent upon the number of baffles employed and the number of corresponding outlet lines provided. The greater the number the greater the range of velocity control available to the operator.

Whereas, I have described and illustrated in some detail a method whereby I may control the particle size of the adsorbent granules, I do not wish nor intend that the scope of this invention be limited to the details described. The invention comprises broadly the combination of the control of such particle size by means of continuous elutriation and the processes in which said control is of importance and may be accomplished by such continuous elutriation. Thus my invention may be employed in catalytic processes and particularly in catalytic processes in which the granular catalyst is cycled from one part of the system to another wherein a certain amount of attrition is bound to occur, in adsorption processes, in treating processes and in other processes in which there occurs a cycling of a granular solid. Similarly my invention may be employed in other applications in which catalysis, adsorption, or the like are not concerned, as for example in the pneumatic conveyance of granular solids for any purpose wherein a chamber may be provided substantially similar to the chamber 51 in the drawing as herein described.

Further, I do not wish to be limited in the scope of my invention to the precise means of accomplishing the elutriation control as illustrated and described herein inasmuch as the invention resides not only in the apparatus disclosed but equally in the adaptation of the principles of elutriation to the problem disclosed and thus other apparatus which may be devised by those familiar with the art for the accomplishment of the same adaptation of the principles of elutriation must of necessity fall within the scope of the present invention. The problem of removing fines from a flowing system of granular solids is a major one and has caused great difficulty in the past and for this reason the present invention is of importance in principle as well as in the specific modes of accomplishment as disclosed.

In general the solid material employed in the above process is preferably granular, about 10 to 40 mesh, although sizes as large as about 4 mesh and as small as about 100 mesh may also be employed.

Having described and illustrated my invention with reference to the broad principles thereof and realizing that many modifications may occur to those skilled in the art without departing from the spirit or scope of the invention, I claim:

An apparatus for the continuous elutriation of granular solids which comprises a chamber provided with inlet means projecting thereinto through the middle of the upper end thereof, a plurality of concentric baffles located in the annular space between said inlet means and the walls of said chamber and extending downward from the upper end of said chamber approximately the same distance as said inlet means, outlet means for granular solids at the lower end of said chamber, and outlet means for gas at the upper end of each concentric annular space formed by said baffles, said walls and said inlet means.

CLYDE H. O. BERG.

References Cited in the file of this patent

UNITED STATES PATENTS

| Number | Name | Date |
|---|---|---|
| 310,905 | Milbank | Jan. 20, 1885 |
| 688,810 | Raymond | Dec. 15, 1901 |
| 840,724 | Sweet | Jan. 8, 1907 |
| 1,285,783 | Nall | Nov. 26, 1918 |
| 1,389,085 | Yager | Aug. 30, 1921 |
| 1,401,795 | Kohler et al. | Dec. 27, 1921 |
| 1,422,007 | Soddy | July 4, 1922 |
| 1,560,519 | Adamson | Nov. 10, 1925 |
| 1,624,519 | Stebbins | Apr. 12, 1927 |
| 1,825,707 | Wagner | Oct. 6, 1931 |
| 2,195,618 | Crites | Apr. 2, 1940 |
| 2,252,581 | Saint-Jacques | Aug. 12, 1941 |
| 2,384,311 | Kearby | Sept. 4, 1945 |
| 2,392,872 | Wolfe | Jan. 15, 1946 |

FOREIGN PATENTS

| Number | Country | Date |
|---|---|---|
| 453,273 | Germany | Dec. 2, 1927 |